US012688309B1

(12) United States Patent
Anzagira et al.

(10) Patent No.: US 12,688,309 B1
(45) Date of Patent: Jul. 21, 2026

(54) METHOD AND SYSTEM FOR ASSESSING THE TRUSTWORTHINESS OF AN ARTIFICIAL INTELLIGENCE MODEL

(71) Applicant: JPMorgan Chase Bank, N.A., New York, NY (US)

(72) Inventors: Allan Anzagira, Long Island City, NY (US); Freddy Lecue, Mamaroneck, NY (US); Nicolas Marchesotti, London (GB); Nikolai Slobodianik, Bayonne, NJ (US); Alexey Kvashchuk, Somers, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 36 days.

(21) Appl. No.: 19/029,427

(22) Filed: Jan. 17, 2025

(51) Int. Cl.
*H04L 29/06* (2006.01)
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 12,021,894 | B2 * | 6/2024 | Clausen | H04L 63/1416 |
| 2020/0184278 | A1 * | 6/2020 | Zadeh | G06N 3/044 |
| 2021/0144442 | A1 * | 5/2021 | Liu | H04N 21/4667 |
| 2022/0405623 | A1 * | 12/2022 | Cheng | G06N 20/20 |

(Continued)

FOREIGN PATENT DOCUMENTS

| | | | | |
|---|---|---|---|---|
| GB | 2642844 A | * | 1/2026 | G06Q 50/10 |
| WO | WO-2005045695 A1 | * | 5/2005 | G06F 40/30 |
| WO | WO-2016057000 A1 | * | 4/2016 | G06F 16/285 |

OTHER PUBLICATIONS

R. Zhang, C. Yi and Y. Chen, "Explainable Machine Learning for Regime-Based Asset Allocation," 2020 IEEE International Conference on Big Data (Big Data), Atlanta, GA, USA, 2020, pp. 5480-5485 (Year: 2020).*

(Continued)

*Primary Examiner* — Shawnchoy Rahman
(74) *Attorney, Agent, or Firm* — GREENBLUM & BERNSTEIN, P.L.C.

(57) ABSTRACT

A method and a system for assessing trustworthiness of an artificial intelligence (AI) model are provided. The method includes: accessing an explainable artificial intelligence (XAI) asset that relates to the AI model; accessing a document that relates to the AI model; separating the XAI asset into XAI asset chunks; separating the document into document chunks; generating, via a pre-trained model, a plurality of chunk embeddings that includes respective embeddings for the XAI asset chunks and the document chunks; accessing a query that relates to the trustworthiness of the AI model; generating, via the pre-trained model, a query embedding for the query; calculating an embedding similarity score for each chunk embedding; selecting a chunk embedding having the highest embedding similarity score; generating a context embedding by aggregating the query embedding with the selected chunk embedding; and generating a response to the query based on the context embedding.

20 Claims, 5 Drawing Sheets

(56) References Cited

U.S. PATENT DOCUMENTS

| | | | |
|---|---|---|---|
| 2023/0043095 A1* | 2/2023 | Milam ................. | H04L 9/3247 |
| 2023/0229945 A1* | 7/2023 | Ferreira ................... | G06N 5/01 |
| | | | 706/46 |
| 2023/0275756 A1* | 8/2023 | Vishwakarma ......... | H04L 9/088 |
| | | | 380/278 |
| 2024/0111902 A1* | 4/2024 | Palatnik de Sousa .. | G06F 21/57 |

OTHER PUBLICATIONS

Humer, Di Christina, and Hendrik Strobelt. "Explainable artificial intelligence." (2023). (Year: 2023).*
Ucer, Serkan, Tansel Ozyer, and Reda Alhaj. "Explainable artificial intelligence through graph theory by generalized social network analysis-based classifier." Scientific Reports 12.1 (2022): 15210. (Year: 2022).*

* cited by examiner

100

300

400

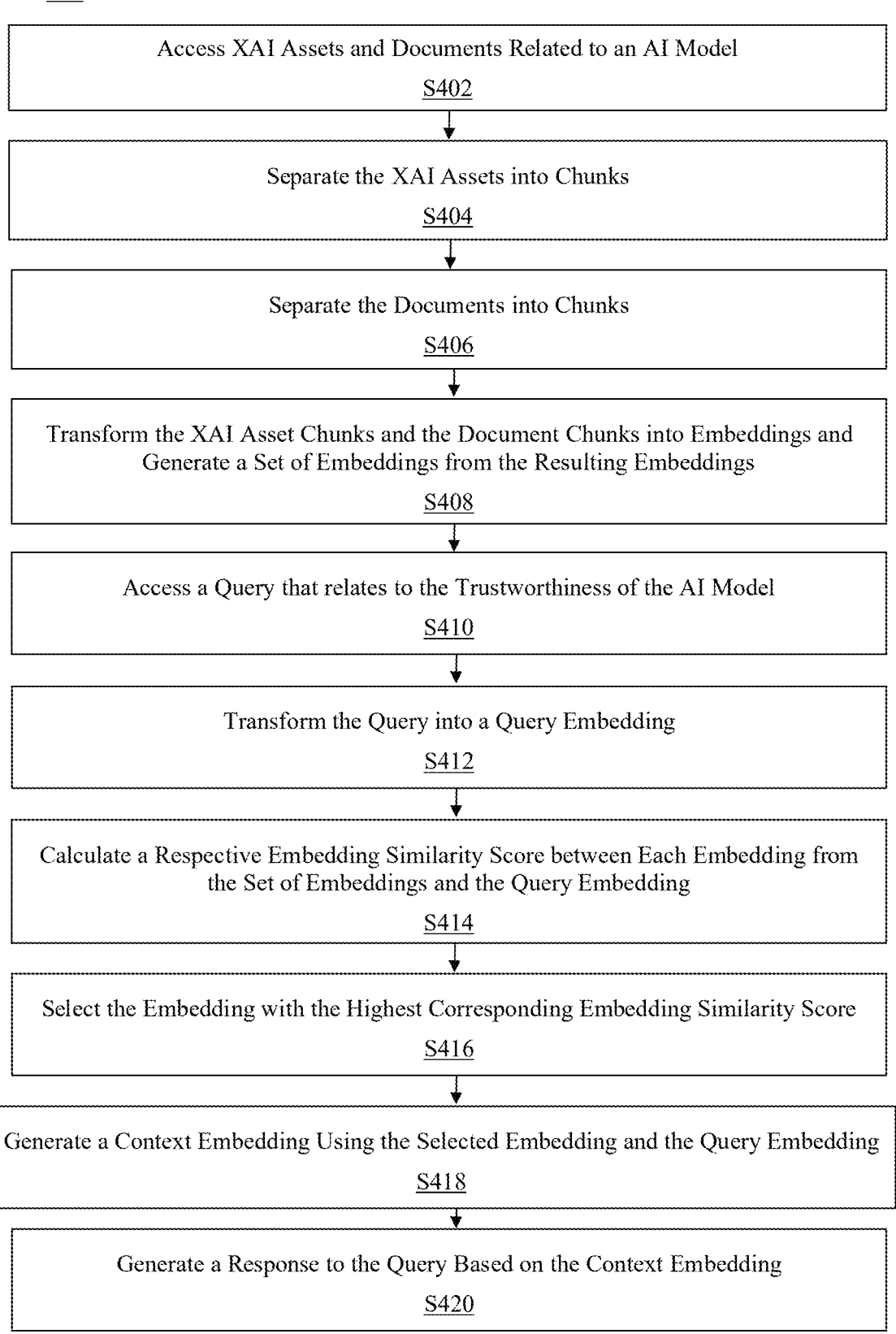

Access XAI Assets and Documents Related to an AI Model
S402

Separate the XAI Assets into Chunks
S404

Separate the Documents into Chunks
S406

Transform the XAI Asset Chunks and the Document Chunks into Embeddings and Generate a Set of Embeddings from the Resulting Embeddings
S408

Access a Query that relates to the Trustworthiness of the AI Model
S410

Transform the Query into a Query Embedding
S412

Calculate a Respective Embedding Similarity Score between Each Embedding from the Set of Embeddings and the Query Embedding
S414

Select the Embedding with the Highest Corresponding Embedding Similarity Score
S416

Generate a Context Embedding Using the Selected Embedding and the Query Embedding
S418

Generate a Response to the Query Based on the Context Embedding
S420

METHOD AND SYSTEM FOR ASSESSING THE TRUSTWORTHINESS OF AN ARTIFICIAL INTELLIGENCE MODEL

BACKGROUND

1. Field of the Disclosure

This disclosure generally relates to methods and systems for assessing trustworthiness of an artificial intelligence (AI) model, and more particularly to methods and systems for generating a series of embeddings related to an AI model in order to assess the explainability and potential risks associated with the AI model.

2. Background Information

Machine learning models are getting more and more integrated in regulated environments such as banks for credit decision and automated trading. For all use cases, model developers are required to produce a comprehensive model documentation for review by model reviewers to ascertain production readiness of the model. Trustworthiness of the model, which encompasses explainability and model risks among others, constitutes a major component of the model review criteria. Model documentation review is an exhaustive process, making it difficult to cover all aspects of assessing model trustworthiness.

Additionally, depending on the output and type of use, certain machine learning models are subject to certain regulatory requirements (e.g., the AI Civil Rights Act, European Union (EU) AI act, etc.). These regulatory requirements often require high explainability of the model to determine the model's trustworthiness. In addition to these regulatory requirements, AI models need to be properly assessed to ensure the security, reliability, and overall trustworthiness of the underlying AI models prior to implementation.

Accordingly, there is a need for a system to leverage information associated with various models to identify various requirements for global explainability and local explainability. Particularly, a method and system are needed for obtaining model information and generating a series of embeddings related to an AI model in order to assess the explainability and potential risks associated with the AI model. Such assessment is crucial to determining the trustworthiness of AI models prior to and following implementation.

SUMMARY

The present disclosure, through one or more of its various aspects, embodiments, and/or specific features or sub-components, provides, inter alia, various systems, servers, devices, methods, media, programs, and platforms for generating a series of embeddings related to an AI model in order to assess the explainability and potential risks associated with the AI model.

According to an aspect of the present disclosure, a method for assessing trustworthiness of an AI model is provided. The method may be implemented by at least one processor. The method may include: accessing, by the at least one processor, at least one explainable artificial intelligence (XAI) asset that relates to the AI model; accessing, by the at least one processor, a document that relates to the AI model; separating, by the at least one processor, the at least one XAI asset into at least one XAI asset chunk; separating, by the at least one processor, the document into at least one document chunk, wherein the separating of the document is based on a predetermined word count; generating, by the at least one processor via a pre-trained model, a plurality of chunk embeddings that include a respective embedding for each respective XAI asset chunk of the at least one XAI asset chunk and each respective document chunk of the at least one document chunk; accessing, by the at least one processor, a query that relates to the trustworthiness of the AI model; generating, by the at least one processor via the pre-trained model, a query embedding for the query; calculating, by the at least one processor, a respective embedding similarity score for each respective chunk embedding of the plurality of chunk embeddings, wherein each respective similarity score is computed by applying a predetermined algorithm to each of the corresponding respective chunk embedding and the query embedding; selecting, by the at least one processor, a respective chunk embedding from the plurality of chunk embeddings having a highest corresponding embedding similarity score; generating, by the at least one processor, a context embedding by aggregating the query embedding with the selected chunk embedding; and generating, by the at least one processor via a large language model (LLM), a response to the query based on the context embedding.

The response may include an answer to the query and a rationale relating to how the answer was generated.

The trustworthiness may relate to at least one from among an explainability of the model and a potential risk associated with the model.

The method may further include assigning, by the at least one processor, a respective weight to each respective chunk embedding of the plurality of chunk embeddings. Each respective weight may be used for the calculating of each corresponding respective embedding similarity score. Each respective weight may fall within a range from 0.0 to 1.0.

Each respective chunk embedding corresponding to a respective XAI asset chunk may be assigned a corresponding respective weight that is greater than a corresponding respective weight assigned to each respective chunk embedding corresponding to a respective document chunk.

The separating of the at least one XAI asset is based on spatial orientation of information contained within the at least one XAI asset.

Each respective embedding similarity score represents a degree to which a context of the corresponding respective chunk embedding matches a context of the query embedding.

The accessing of the query may include generating, by the at least one processor, the query. The query may relate to an explainability of the AI model.

The generated query may relate to a regulatory requirement associated with the AI model.

According to another aspect of the present disclosure, a computing apparatus for assessing trustworthiness of an AI model is provided. The computing apparatus may include a processor; a memory; and a communication interface coupled to each of the processor, and the memory. The processor may be configured to: access at least one XAI asset that relates to the AI model; access a document that relates to the AI model; separate the at least one XAI asset into at least one XAI asset chunk; separate the document into at least one document chunk, wherein the separating of the document is based on a predetermined word count; generate, via a pre-trained model, a plurality of chunk embeddings that include a respective embedding for each respective XAI asset chunk of the at least one XAI asset chunk and each respective document chunk of the at least one document chunk; access a query that relates to the trustworthiness of the AI model; generate, via the pre-trained model, a query embedding for the query; calculate a respective embedding similarity score for each respective chunk embedding of the plurality of chunk embeddings, wherein each respective similarity score is computed by applying a predetermined algorithm to each of the corresponding respective chunk embedding and the query embedding; select a respective chunk embedding from the plurality of chunk embeddings having a highest corresponding embedding similarity score; generate a context embedding by aggregating the query embedding with the selected chunk embedding; and generate, via an LLM, a response to the query based on the context embedding.

The response may include an answer to the query and a rationale relating to how the answer was generated.

The trustworthiness may relate to at least one from among an explainability of the model and a potential risk associated with the model.

The processor may be further configured to assign a respective weight to each respective chunk embedding of the plurality of chunk embeddings. Each respective weight may be used for the calculating of each corresponding respective embedding similarity score. Each respective weight may fall within a range from 0.0 to 1.0.

Each respective chunk embedding corresponding to a respective XAI asset chunk may be assigned a corresponding respective weight that is greater than a corresponding respective weight assigned to each respective chunk embedding corresponding to a respective document chunk.

The separating of the at least one XAI asset may be based on spatial orientation of information contained within the at least one XAI asset.

Each respective embedding similarity score may represent a degree to which a context of the corresponding respective chunk embedding matches a context of the query embedding.

The accessing of the query may include generating the query. The query may relate to an explainability of the AI model.

The generated query may relate to a regulatory requirement associated with the AI model.

According to yet another aspect of the present disclosure, a non-transitory computer readable storage medium storing instructions for assessing trustworthiness of an AI model is provided. The storage medium includes executable code which, when executed by a processor, may cause the processor to: access at least one XAI asset that relates to the AI model; access a document that relates to the AI model; separate the at least one XAI asset into at least one XAI asset chunk; separate the document into at least one document chunk, wherein the separating of the document is based on a predetermined word count; generate, via a pre-trained model, a plurality of chunk embeddings that include a respective embedding for each respective XAI asset chunk of the at least one XAI asset chunk and each respective document chunk of the at least one document chunk; access a query that relates to the trustworthiness of the AI model; generate, via the pre-trained model, a query embedding for the query; calculate a respective embedding similarity score for each respective chunk embedding of the plurality of chunk embeddings, wherein each respective similarity score is computed by applying a predetermined algorithm to each of the corresponding respective chunk embedding and the query embedding; select a respective chunk embedding from the plurality of chunk embeddings having a highest corresponding embedding similarity score; generate a context embedding by aggregating the query embedding with the selected chunk embedding; and generate, via an LLM, a response to the query based on the context embedding.

The response may include an answer to the query and a rationale relating to how the answer was generated.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 illustrates a process diagram of a process for generating a series of embeddings related to an AI model in order to assess the explainability and potential risks associated with the AI model, according to an embodiment.

DETAILED DESCRIPTION

Figure 1:
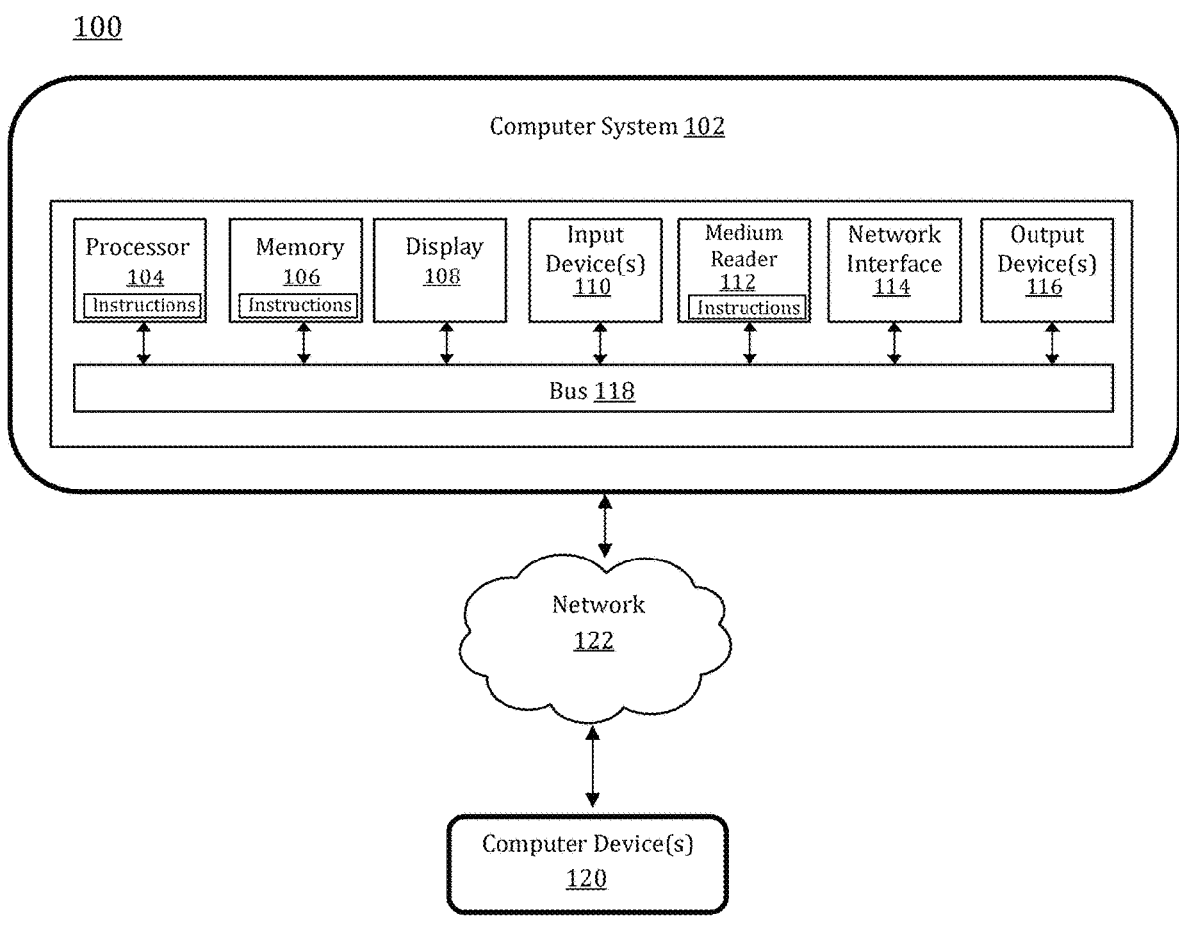
FIG. 1 illustrates a computer system for generating a series of embeddings related to an AI model in order to assess the explainability and potential risks associated with the AI model, according to an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or similar, they may be programmed using software (e.g., microcode) to perform various functions discussed herein and may optionally be driven by firmware and/or software. Alternatively, each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of the example embodiments may be physically separated into two or more inter-acting and discrete blocks, units, and/or modules without departing from the scope of the inventive concepts. Further, the blocks, units, and/or modules of the example embodiments may be physically combined into more complex blocks, units, and/or modules without departing from the scope of the present disclosure.

A system or method disclosed herein assesses the trust-worthiness of AI models. Particularly, the system accesses XAI assets and documents related to the AI model. The system then separates both the XAI assets and the docu-ments into relevant chunks of information. The system then takes each of these chunks and uses a pre-trained model to transform them into respective embeddings and compiles them to generate a set of all the embeddings. The system then generates or receives a query that relates to the trust-worthiness of the AI model. Specifically, the query may be related to identifying the explainability of the model and/or potential risks associated with the model. Next, the system uses the pre-trained model to transform the query into a query embedding. The system then applies an algorithm to compute a similarity score between each respective chunk embedding and the query embedding. The system then selects the embedding that has the highest corresponding similarity score and generates a context embedding by combining the query embedding and the embedding with the highest corresponding similarity score. Then, based on the context embedding the system uses an LLM to generate a response to the query that includes an answer to the query and a rationale for the answer.

By accessing various information associated with an AI model and generating embeddings for this information, the system is able to provide the most relevant information regarding the explainability and risk associated with the model for determining the trustworthiness of the model. Particularly, the system enables a thorough and focused assessment of AI models in order to ensure their security, reliability, and overall trustworthiness prior to implementa-tion. Additionally, the system leverages information associ-ated with various AI models to identify various requirements for global explainability and local explainability to ensure that they adhere to various regulatory requirements. More-over, the system may provide a technical improvement by determining underlying risks associated with an AI model, such that the particular AI model may be altered or improved so as to prevent potential issues or security risks.

FIG. 1 is a system 100 for generating a series of embed-dings related to an AI model in order to assess the explain-ability and potential risks associated with the AI model, in accordance with an embodiment. The system 100 is gener-ally shown and may include a computer system 102, which is generally indicated.

The computer system 102 may include a set of instruc-tions that may be executed to cause the computer system 102 to perform any one or more of the methods or computer-based functions disclosed herein, either alone or in combi-nation with the other described devices. The computer system 102 may operate as a standalone device or may be connected to other systems or peripheral devices. For example, the computer system 102 may include, or be included within, any one or more computers, servers, sys-tems, communication networks, or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, vari-ous devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequen-tial or otherwise) that specify actions to be taken by that machine. Further, while a single computer system 102 is illustrated, additional embodiments may include any collec-tion of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instruc-tions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field program-mable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communica-tion. Memories described herein are tangible storage medi-ums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In an embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, and serial advanced technology attachment.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 may be a personal computer. However, those skilled in the art appreciate that, in alternative embodiments of the present application, the computer device 120 may also be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the AI model assessment module implemented by the system 100 may allow for generating a series of embeddings related to an AI model in order to assess the explainability and potential risks associated with the AI model. The configuration or data files, in some embodiments, may be written using JavaScript Object Notation (JSON), but the disclosure is not limited thereto. For example, the configuration or data files may easily be extended to other readable file formats such as Extensible Markup Language (XML), Yet Another Markup Language (YAML), or any other configuration-based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionalities as described herein, and a processor described herein may be used to support a virtual processing environment.

Figure 2:
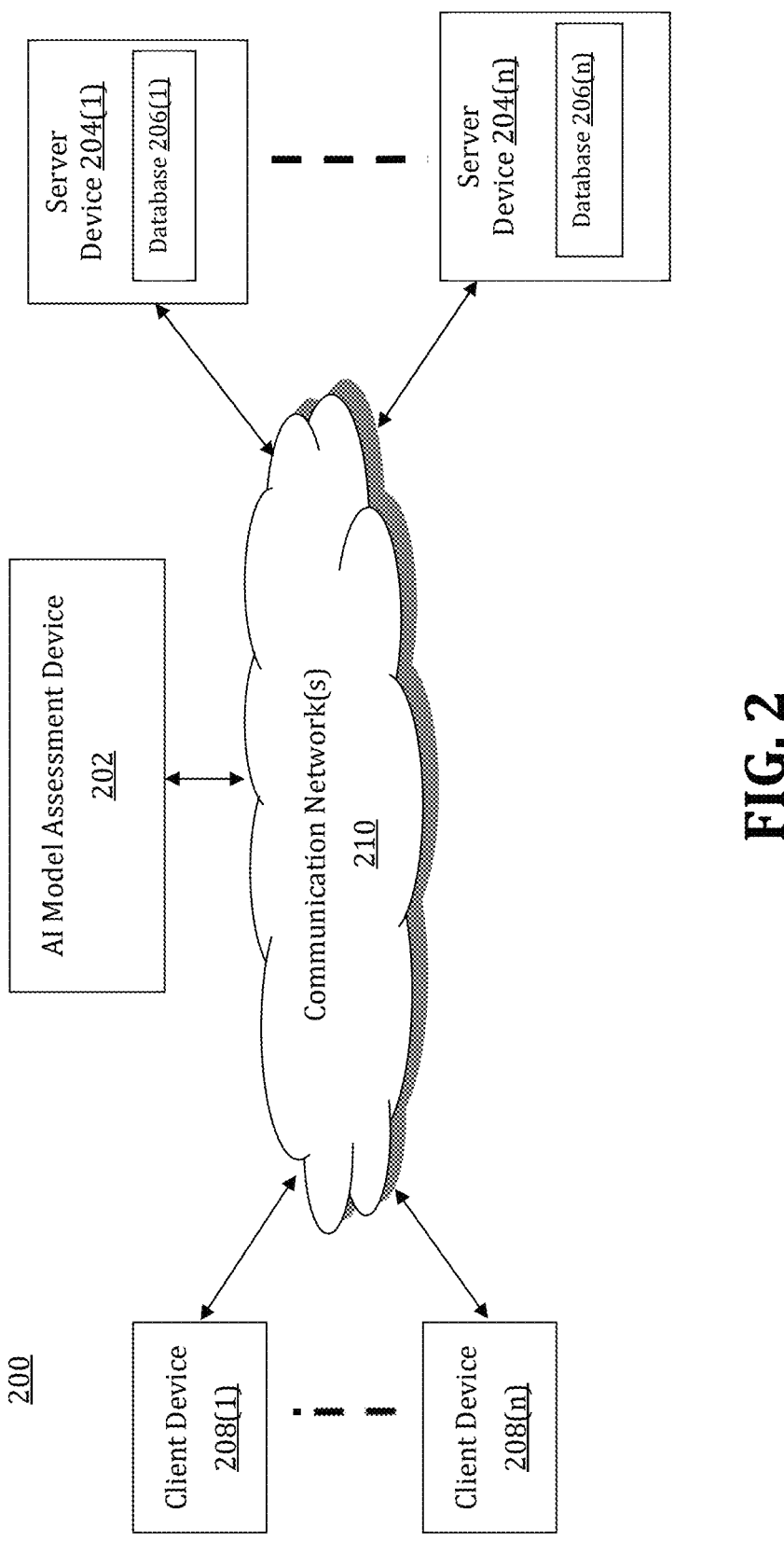
FIG. 2 illustrates a diagram of a network environment for generating a series of embeddings related to an AI model in order to assess the explainability and potential risks associated with the AI model, according to an embodiment.

Referring to FIG. 2, a schematic of a network environment 200 for generating a series of embeddings related to an AI model in order to assess the explainability and potential risks associated with the AI model is illustrated.

In some embodiments, the above-described problems associated with conventional tools may be overcome by implementing an AI model assessment device 202 as illustrated in FIG. 2 that may be configured for generating a series of embeddings related to an AI model in order to assess the explainability and potential risks associated with the AI model, but the disclosure is not limited thereto.

The AI model assessment device 202 may include one or more computer systems 102, as described with respect to FIG. 1, which in aggregate provide the necessary functions.

The AI model assessment device 202 may store one or more applications that can include executable instructions that, when executed by the AI model assessment device 202, cause the AI model assessment device 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AI model assessment device 202 itself, may be located in virtual server(s) running in a cloud-based computing environment rather than being tied to one or more specific physical network computing devices. Also, the application(s) may be running in one or more virtual machines (VMs) executing on the AI model assessment device 202. Additionally, in one or more embodiments of this technology, virtual machine(s) running on the AI model assessment device 202 may be managed or supervised by a hypervisor.

In the network environment 200 of FIG. 2, the AI model assessment device 202 may be coupled to a plurality of server devices 204(1)-204(n) that hosts a plurality of data-bases 206(1)-206(n), and also to a plurality of client devices 208(1)-208(n) via communication network(s) 210. A communication interface of the AI model assessment device 202, such as the network interface 114 of the computer system 102 of FIG. 1, operatively couples and communicates between the AI model assessment device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AI model assessment device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use Transmission Control Protocol/Internet Protocol (TCP/IP) over Ethernet and industry-standard protocols, although other types and/or numbers of protocols and/or communication networks may be used. The communication network(s) 210 in this example may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

The AI model assessment device 202 may be a standalone device or integrated with one or more other devices or apparatuses, such as one or more of the server devices 204(1)-204(n), for example. In one example, the AI model assessment device 202 may be hosted by one of the server devices 204(1)-204(n), and other arrangements are also possible. Moreover, one or more of the devices of the AI model assessment device 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AI model assessment device 202 via the communication network(s) 210 according to the Hypertext Transfer Protocol (HTTP)-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

In some embodiments, the client devices 208(1)-208(n) in this example may include any type of computing device that can facilitate the implementation of the AI model assessment device 202 that may generate a series of embeddings related to an AI model in order to assess the explainability and potential risks associated with the AI model, but the disclosure is not limited thereto.

The client devices 208(1)-208(n) may run interface applications, such as standard web browsers or standalone client applications, which may provide an interface to communicate with the AI model assessment device 202 via the communication network(s) 210 in order to communicate user requests. The client devices 208(1)-208(n) may further include, among other features, a display device, such as a display screen or touchscreen, and/or an input device, such as a keyboard, for example.

Although the network environment 200 with the AI model assessment device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the AI model assessment device 202, the server devices 204(1)-204(n), or the client devices 208(1)-208(n), for example, may be configured to operate as virtual instances on the same physical machine. For example, one or more of the AI model assessment devices 202, the server devices 204(1)-204(n), or the client devices 208(1)-208(n) may operate on the same physical device rather than as separate devices communicating through communication network(s) 210. Additionally, there may be more or fewer AI model assessment devices 202, server devices 204(1)-204(n), or client devices 208(1)-208(n) than illustrated in FIG. 2. In some embodiments, the AI model assessment device 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
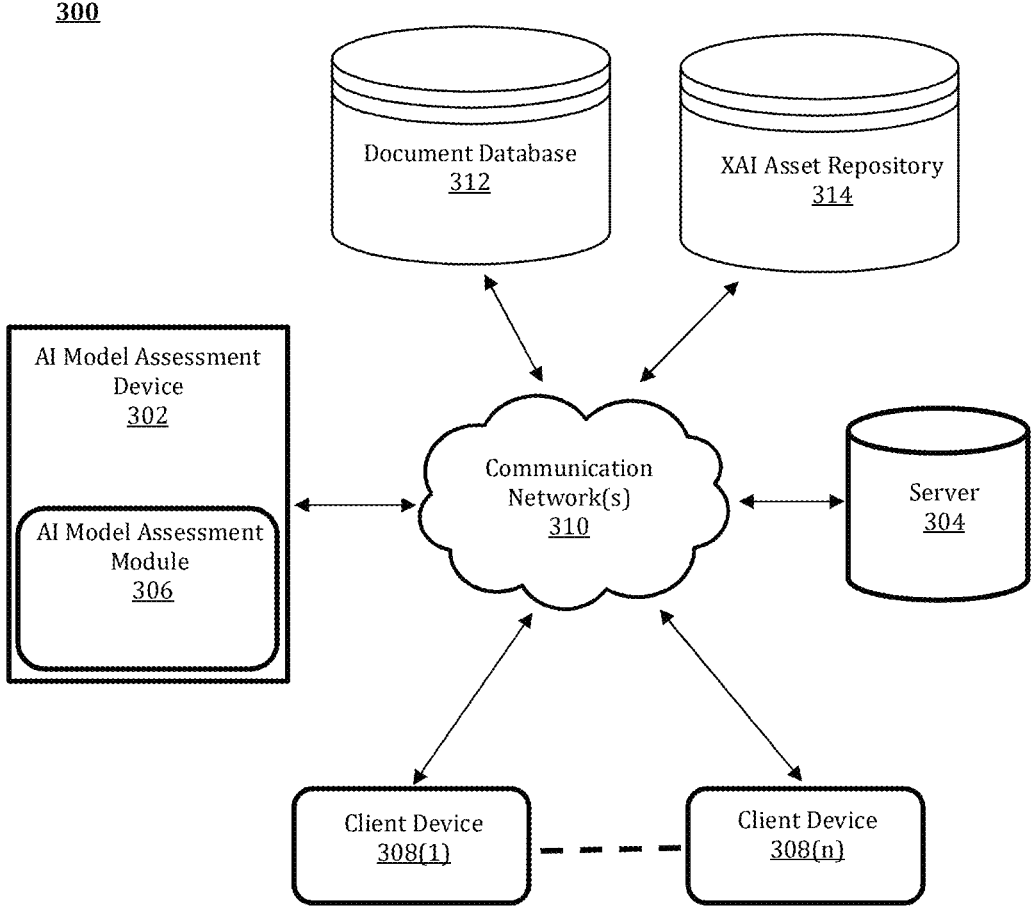
FIG. 3 illustrates a system diagram of a system for generating a series of embeddings related to an AI model in order to assess the explainability and potential risks associated with the AI model, according to an embodiment.

FIG. 3 illustrates a system diagram for generating a series of embeddings related to an AI model in order to assess the explainability and potential risks associated with the AI model, in accordance with an embodiment.

As illustrated in FIG. 3, the system 300 may include an AI model assessment device 302 within which an AI model assessment module 306 is embedded, a server 304, a document database 312, an XAI asset repository 314, a plurality of client devices 308(1) . . . 308(n), and a communication network 310.

In some embodiments, the AI model assessment device 302 including the AI model assessment module 306 may be connected to the server 304 the document database 312 and the XAI asset repository 314 via the communication network 310. The AI model assessment device 302 may also be connected to the plurality of client devices 308(1) . . . 308(n) via the communication network 310, but the disclosure is not limited thereto. The document database 312 and the XAI asset repository 314 may include one or more repositories or databases.

In an embodiment, the AI model assessment device 302 is described and shown in FIG. 3 as including AI model assessment module 306, although it may include other rules, policies, modules, databases, or applications, for example. In some embodiments, the document database 312 and the XAI asset repository 314 may be configured to store ready to use modules written for each API for all environments. Although only one database is illustrated in FIG. 3, the disclosure is not limited thereto. Any number of desired databases and/or repositories may be utilized for use in the disclosed invention herein. Each of the document database 312 and the XAI asset repository 314 may be a mainframe database, a log database that may produce programming for searching, monitoring, and analyzing machine-generated data via a web interface, but the disclosure is not limited thereto. In addition, the document database 312 and the XAI asset repository 314 may store a plurality of data sets and predictive models for assessing the trustworthiness of AI models.

In some embodiments, the AI model assessment module 306 may be configured to receive a real-time feed of data from the plurality of client devices 308(1) . . . 308(n) and secondary sources via the communication network 310.

The AI model assessment module 306 may be configured to: access at least one explainable artificial intelligence (XAI) asset that relates to the AI model; access a document that relates to the AI model; separate the at least one XAI asset into at least one XAI asset chunk; separate the document into at least one document chunk, wherein the separating of the document is based on a predetermined word count; generate, via a pre-trained model, a plurality of chunk embeddings that include a respective embedding for each respective XAI asset chunk of the at least one XAI asset chunk and each respective document chunk of the at least one document chunk; access a query that relates to the trustworthiness of the AI model; generate, via the pre-trained model, a query embedding for the query; calculate a respective embedding similarity score for each respective chunk embedding of the plurality of chunk embeddings, wherein each respective similarity score is computed by applying a predetermined algorithm to each of the corresponding respective chunk embedding and the query embedding; select a respective chunk embedding from the plurality of chunk embeddings having a highest corresponding embedding similarity score; generate a context embedding by aggregating the query embedding with the selected chunk embedding; and generate, via an LLM, a response to the query based on the context embedding.

The plurality of client devices 308(1) . . . 308(n) are illustrated as being in communication with the AI model assessment device 302. In this regard, the plurality of client devices 308(1) . . . 308(n) may be "clients" (e.g., customers) of the AI model assessment device 302 and are described herein as such. Nevertheless, it is to be known and understood that the plurality of client devices 308(1) . . . 308(n) need not necessarily be "clients" of the AI model assessment device 302, or any entity described in association therewith herein. Any additional or alternative relationship may exist between either or both plurality of client devices 308(1) . . . 308(n) and the AI model assessment device 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the pluralities of client devices 308(1) . . . 308(n) may communicate with the AI model assessment device 302 via broadband or cellular communication. Of course, these embodiments are merely exemplary and are not limiting or exhaustive.

The client devices 308(1)-308(n) may be the same or similar to any one of the client devices 208(1)-208(n) as described with respect to FIG. 2, including any features or combination of features described with respect thereto. The AI model assessment device 302 may be the same or similar to the AI model assessment device 202 as described with respect to FIG. 2, including any features or combination of features described with respect thereto.

Upon being started, the AI model assessment device 302 executes a process for generating a series of embeddings related to an AI model in order to assess the explainability and potential risks associated with the AI model.

FIG. 4 illustrates a process 400 for generating a series of embeddings related to an AI model in order to assess the explainability and potential risks associated with the AI model, according to an embodiment.

In process 400 of FIG. 4, at step S402, the AI model assessment device 302 may access XAI assets and documents that relate to an AI model. The XAI assets may provide a description or explanation describing the attributes and/or features of the AI model. In an embodiment, the XAI asset may be stored as json file. The documents may include model documentation that describes or explains the AI model. In an embodiment, the XAI assets and documents may be received as inputs provided by a user. In some embodiments, the XAI assets and documents may be retrieved from a portal. The XAI assets and documents may be retrieved from a database or repository (e.g., document database 312 and XAI asset repository 314).

At step S404, the AI model assessment device 302 may separate the XAI assets into at least one chunk or sub-component. In an embodiment, the XAI assets may be separated into chunks based on spatial orientation of information contained within the XAI assets. The XAI assets may also be separated into chunks based on keyword proximity of information contained within the XAI assets. For example, the XAI assets may be separated such that each chunk represents an individual XAI asset, thus, capturing each individual XAI asset and its corresponding information in full entirety.

At step S406, the AI model assessment device 302 may separate the document into at least one document chunk or sub-component of the document. The document may be separated into chunks based on a predetermined word count. For example, the document may be separated into chunks having a certain number of words (e.g., 500 words).

At step S408, the AI model assessment device 302 may generate a plurality of chunk embeddings by transforming each of the XAI asset chunks and the document chunks into embeddings, and creating a set of embeddings from these resulting embeddings. The plurality of chunk embeddings may include a respective embedding for each respective XAI asset chunk and each respective document chunk. In some embodiments, the AI model assessment device 302 may use a pre-trained model (e.g., transformer-based model) for transforming the XAI asset chunks and the document chunks into embeddings. In an embodiment, the embeddings may be a string of numerical values (e.g., between 0.0 and 1.0) that represent the text or keywords present within the corresponding chunk from which the embedding was transformed from. For example, according to an embodiment, an XAI asset chunk may be transformed into the corresponding embedding: [0.6, 0.4, 0.2, 0.3, 0.7].

At step S410, the AI model assessment device 302 may access a query that relates to the AI model. The query may relate to the trustworthiness of the AI model. For example, the query may relate to an explainability of the model and/or a potential risk associated with the model. The query may relate to the identification of various requirements for global explainability and local explainability. For example, in an embodiment, the query may be: "Give me an explainability technique that can work for the model in the document that is provided." In an embodiment, the query may be received as input from a user. In some embodiments, the AI model assessment device 302 may generate the query to provide explainability and/or identify potential risk of the model. In an embodiment, the query may relate to a regulatory requirement associated with the AI model (e.g., the AI Civil Rights Act, the EU AI act, etc.).

At step S412, the AI model assessment device 302 may transform the query into a query embedding. In some embodiments, the AI model assessment device 302 may use a pre-trained model (e.g., transformer-based model) for transforming the query into an embedding. In an embodiment, the embedding may be a string of numerical values (e.g., between 0.0 and 1.0) that represent the text or keywords present within the query. For example, a query may be transformed into the corresponding embedding: [0.2, 0.4, 0.3, 0.1, 0.6].

At step S414, the AI model assessment device 302 may calculate respective embedding similarity scores for each respective chunk embedding from the set of embeddings that corresponds to a similarity between each respective chunk embedding and the query embedding. For example, the AI model assessment device 302 may calculate an embedding similarity score between each XAI chunk embedding and the query embedding. The AI model assessment device 302 may also calculate an embedding similarity score between each document chunk embedding and the query embedding. The similarity scores may be computed by applying a predetermined algorithm to each of the corresponding respective chunk embedding and the query embedding. For example, according to an embodiment, given an XAI chunk embedding of [0.6, 0.4, 0.2, 0.3, 0.7], and a query embedding of [0.2, 0.4, 0.3, 0.1, 0.6], the similarity score may be computed as $[0.2*0.6+0.4*0.4+0.3*0.2+0.1*0.3+0.6*0.7]$ $=0.79$. In some embodiments, the embedding similarity scores may represent a degree to which a context of the corresponding respective chunk embedding matches a context of the query embedding.

In an embodiment, a respective weight may be assigned to each respective chunk embedding. Each respective weight may be used for calculating the corresponding respective embedding similarity scores. In an embodiment, each respective weight may fall within a range from 0.0 to 1.0. In some embodiments, the respective weight(s) for the XAI asset chunk embeddings may be greater than the respective weight(s) assigned for the document chunk embeddings. For example, according to an embodiment, the XAI asset chunk embeddings may be assigned a weight of 0.7, whereas the document chunk embeddings may be assigned a weight of 0.3. Thus, for example, given an XAI chunk embedding of [0.6, 0.4, 0.2, 0.3, 0.7], a document chunk embedding of [0.6, 0.3, 0.5, 0.5, 0.6], a query embedding of [0.2, 0.4, 0.3, 0.1, 0.6], an XAI asset chunk embedding weight of 0.7, and a document chunk embedding weight of 0.3, the corresponding similarity scores may be computed as xai_1-q=0.7*[0.2*0.6+0.4*0.4+0.3*0.2+0.1*0.3+0.6*0.7]=0.553 for the XAI asset chunk embedding, and doc_1-q=0.3*[0.2*0.6+0.4*0.3+0.3*0.5+0.1*0.5+0.6*0.6]=0.24 for the document chunk embedding.

At step S416, the AI model assessment device 302 may select the embedding with the highest corresponding embedding similarity score from the set of embeddings. For example, given an XAI asset chunk embedding having a corresponding computed similarity score of 0.553 and a document chunk embedding having a corresponding computed similarity score of 0.24, the AI model assessment device 302 may select the XAI asset chunk embedding as having the highest embedding similarity score.

At step S418, the AI model assessment device 302 may generate a context embedding using the selected embedding and the query embedding. In an embodiment, the context embedding may be generated by aggregating the query embedding with the selected chunk embedding. For example, according to an embodiment, given a selected chunk embedding of [0.6, 0.4, 0.2, 0.3, 0.7], and a query embedding of [0.2, 0.4, 0.3, 0.1, 0.6], the context embedding may correspond to [0.2, 0.4, 0.3, 0.1, 0.6, 0.6, 0.4, 0.2, 0.3, 0.7].

Then, at step S420, the AI model assessment device 302 may generate a response to the query based on the context embedding. In an embodiment, the AI model assessment device 302 may use an LLM to generate the response. In some embodiments, the response may include an answer to the query and a rationale relating to how the answer was generated. For example, according to an embodiment, for the query "give me an explainability technique that can work for the model in the document that is provided" the AI model assessment device 302 may generate the answer "integrated gradient is a gradient based technique that provides local explainability for deep neural networks," based on the generated context embedding. The AI model assessment device 302 may also generate the corresponding rationale "source xai_1 has the highest similarity score and is the most relevant for the response."

Figure 5:
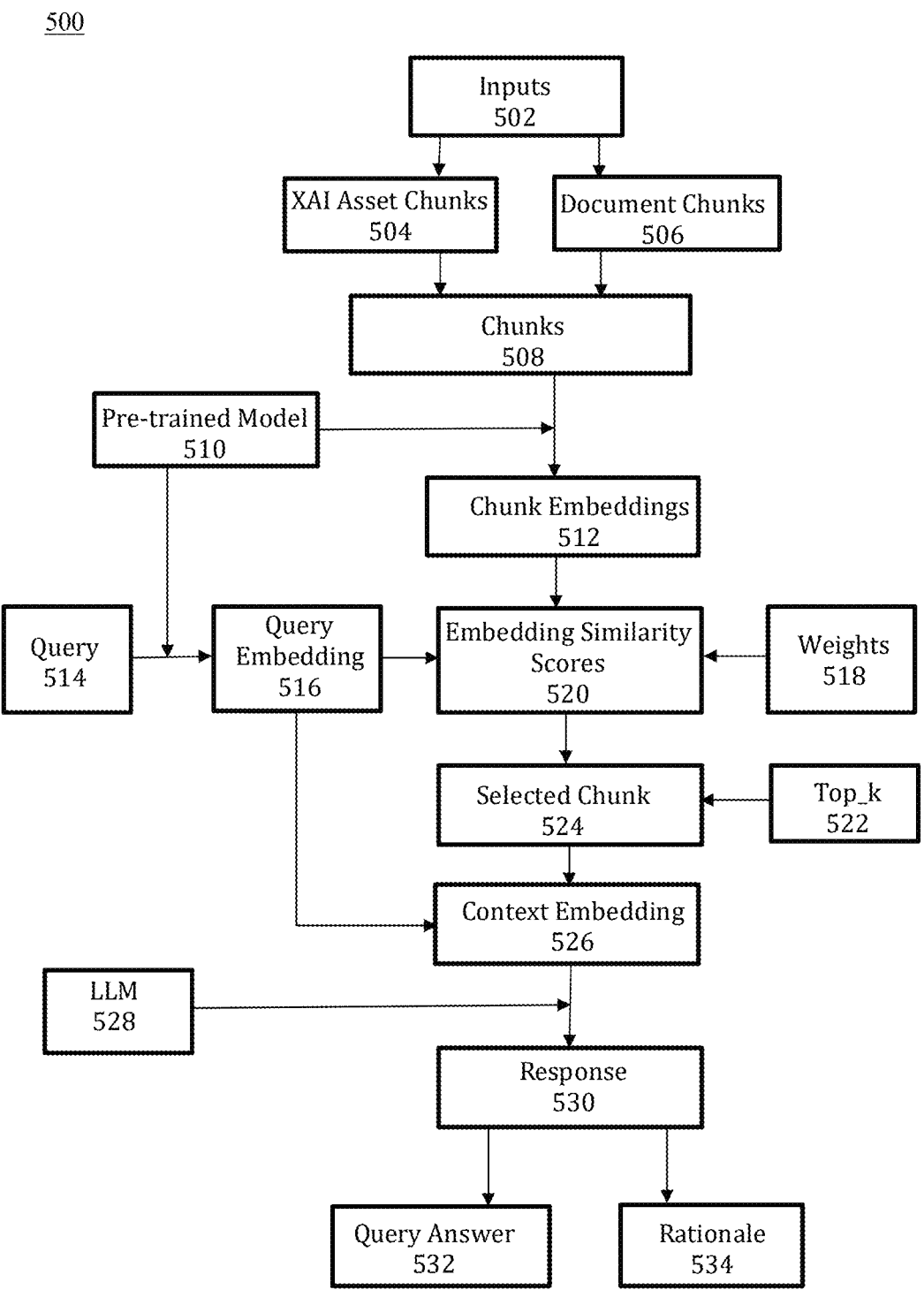
FIG. 5 illustrates a flow diagram of a process for generating a series of embeddings related to an AI model in order to assess the explainability and potential risks associated with the AI model, according to an embodiment.

FIG. 5 illustrates a flow diagram 500 of a process for generating a series of embeddings related to an AI model in order to assess the explainability and potential risks associated with the AI model, according to an embodiment. Particularly, the flow diagram 500 illustrates an implementation of the process 400 from FIG. 4, according to an embodiment.

FIG. 5 shows that the flow diagram 500 includes inputs 502. The inputs 502 may include documents and XAI assets that relate to an AI model. The XAI assets may provide a description or explanation describing the attributes and/or features of the AI model. For example, according to an embodiment, the XAI assets may be: {'title': 'Integrated Gradient', 'description': 'Integrated Gradient (IG) is a gradient based technique to attribute the predictions of Deep Neural Networks (DNNs) to the input features. IG computes the importance of a feature by integrating the gradient of the model output by varying the feature value between an uninformative baseline and the actual value of the feature.'}

{'title': Interventional TreeSHAP', 'description': 'TreeSHAP is an exact, efficient algorithm to compute SHAP values for tree ensemble-based models such as XGBoost. SHAP values are used as feature attributions for both local and global explanations.'}. The documents may include model documentation that describes or explains the AI model. For example, according to an embodiment, the document may include the description: "Deep neural networks are employed for a variety of financial applications including portfolio management, fraud detection and credit risk management. Other commonly employed models in these applications include logistic regression and tree-based models. linear regression offers simplicity and transparency."

As illustrated in FIG. 5, the inputs 502 may be separated into XAI asset chunks 504 and document chunks 506. In an embodiment, the XAI assets may be separated so that each individual asset is an individual chunk. For example, given the XAI assets listed above, the XAI assets may be separated into the corresponding two chunks: xai_1= "Integrated Gradient (IG) is a gradient based technique to attribute the predictions of Deep Neural Networks (DNNs) to the input features. IG computes the importance of a feature by integrating the gradient of the model output by varying the feature value between an uninformative baseline and the actual value of the feature."; and xai 2= "TreeSHAP is an exact, efficient algorithm to compute SHAP values for tree ensemble-based models such as XGBoost. SHAP values are used as feature attributions for both local and global explanations." The separating of the XAI assets into XAI asset chunks may take into account the spatial representations of information and/or keywords located within the XAI assets. In an embodiment, the documents may be separated into chunks based on word count (e.g., 20). For example, given the document listed above, the document may be separated into the corresponding two chunks: doc_1= "Deep neural networks are employed for a variety of financial applications including portfolio management, fraud detection and credit risk management."; and doc_2= "Other commonly employed models in these applications include logistic regression and tree-based models. linear regression offers simplicity and transparency."

Each of the XAI asset chunks 504 and the document chunks 506 are compiled into a set of chunks 508. Then, the chunks 508 are transformed or generated into chunk embeddings 512 using the pre-trained model 510 (e.g., transformer-based model). In an embodiment, the embeddings may be a string of numerical values (e.g., between 0.0 and 1.0) that represent the text or keywords present within the corresponding chunk from which the embedding was transformed from. For example, according to an embodiment, the chunk embeddings 512 may be generated as doc_1= [0.6, 0.3, 0.5, 0.5, 0.6]; doc_2= [0.1, 0.2, 0.3, 0.5, 0.4]; xai_1= [0.6, 0.4, 0.2, 0.3, 0.7]; xai_2= [0.2, 0.1, 0.2, 0.5, 0.5].

Next, a query 514 is received or generated. The query may relate to the trustworthiness of the AI model. For example, in an embodiment, the query may be: "Give me an explainability technique that can work for the model in the document that is provided." Then, the query is transformed into a query embedding 516 using the pre-trained model 510. Next, embedding similarity scores 520 are computed based on the chunk embeddings 512, the query embedding 516, and predetermined weights 518. According to an embodiment, the chunk embeddings 512 may contain labels that distinguish the document chunk embeddings from the XAI asset chunk embeddings. The predetermined weights may be used to weight the XAI asset chunk embeddings more heavily than the document chunk embeddings using the assigned labels to distinguish the XAI asset chunk embeddings from the document chunk embeddings. Each respective weight may fall within a range from 0.0 to 1.0. For example, the XAI asset chunk embeddings may be assigned a weight of 0.7, whereas the document chunk embeddings may be assigned a weight of 0.3. The embedding similarity scores 520 may be computed as z*(dot product of chunk and query embeddings), where z is the predetermined weighting factor. For example, given the chunk embeddings 512 of doc_1= [0.6, 0.3, 0.5, 0.5, 0.6]; doc_2= [0.1, 0.2, 0.3, 0.5, 0.4]; xai_1= [0.6, 0.4, 0.2, 0.3, 0.7]; xai_2= [0.2, 0.1, 0.2, 0.5, 0.5], where z=0.7 for XAI asset chunk embeddings, and z=0.3 for document chunk embeddings, the embedding similarity scores 520 may be computed as: doc_1-q=0.3* [0.2*0.6+0.4*0.3+0.3*0.5+0.1*0.5+0.6*0.6]=0.24; doc_2-q=0.3*[0.1*0.2+0.4*0.2+0.3*0.3+0.1*0.5+0.6*0.4]=0.126; xai_1-q=0.7*[0.2*0.6+0.4*0.4+0.3*0.2+0.1*0.3+0.6*0.7] = 0.553; xai_2-q=0.7*[0.2*0.2+0.4*0.1+0.3*0.2+0.1*0.5+ 0.6*0.5]=0.343.

Once the embedding similarity scores 520 are generated, a top_k parameter 522 is used to retrieve the selected chunk embedding 524 from the chunk embeddings 512 based on the similarity scores. The top_k parameter 522 may ensure that the selected chunk embedding 524 has the highest corresponding embedding similarity score. When the embeddings are heavily weighted in favor of the XAI assets the embedding similarity calculation ensures that XAI Asset chunks are retrieved more often over the document chunks, based on the top_k parameter 522. For example, given the computed example similarity scores described above, xai_1 had the highest computed embedding similarity score and would be the selected chunk embedding 524.

The selected chunk embedding 524 and the query embedding 516 are then used to generate a context embedding 526. In an embodiment, the query embedding 516 and the selected chunk embedding are aggregated to generate the context embedding 526. For example, given a query embedding 516 of [0.2, 0.4, 0.3, 0.1, 0.6], and a selected chunk embedding 524 of [0.6, 0.4, 0.2, 0.3, 0.7], the context embedding 526 would be generated as [0.2, 0.4, 0.3, 0.1, 0.6, 0.6, 0.4, 0.2, 0.3, 0.7].

Then, an LLM 528 generates a response 530 from the context embedding 526. The LLM 528 may generate the response 530 using context from the context embedding 526, and highlights source/rationale for the response 530. Specifically, as illustrated in FIG. 5, the response 530 includes a query answer 532 and a rationale 534. For example, a query answer 532 may be "Integrated Gradient is a gradient based technique that provides local explainability for deep neural networks," and the rationale 534 may be source xai_1 has the highest similarity score and is most relevant for the response.

Accordingly, with this technology, an optimized process for generating a series of embeddings related to an AI model in order to assess the explainability and potential risks associated with the AI model is provided.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials, and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for assessing trustworthiness of an artificial intelligence (AI) model, the method being implemented by at least one processor, the method comprising:

accessing, by the at least one processor, at least one explainable artificial intelligence (XAI) asset that relates to the AI model;

accessing, by the at least one processor, a document that relates to the AI model;

separating, by the at least one processor, the at least one XAI asset into at least one XAI asset chunk;

separating, by the at least one processor, the document into at least one document chunk, wherein the separating of the document is based on a predetermined word count;

generating, by the at least one processor via a pre-trained model, a plurality of chunk embeddings that includes a respective embedding for each respective XAI asset chunk of the at least one XAI asset chunk and each respective document chunk of the at least one document chunk;

accessing, by the at least one processor, a query that relates to the trustworthiness of the AI model;

generating, by the at least one processor via the pre-trained model, a query embedding for the query;

calculating, by the at least one processor, a respective embedding similarity score for each respective chunk embedding of the plurality of chunk embeddings, wherein each respective similarity score is computed by applying a predetermined algorithm to each of the corresponding respective chunk embedding and the query embedding;

selecting, by the at least one processor, a respective chunk embedding from the plurality of chunk embeddings having a highest corresponding embedding similarity score;

generating, by the at least one processor, a context embedding by aggregating the query embedding with the selected chunk embedding; and generating, by the at least one processor via a large language model (LLM), a response to the query based on the context embedding.

2. The method of claim 1, wherein the response includes an answer to the query and a rationale relating to how the answer was generated.

3. The method of claim 1, wherein the trustworthiness relates to at least one from among an explainability of the model and a potential risk associated with the model.

4. The method of claim 1, further comprising:

assigning, by the at least one processor, a respective weight to each respective chunk embedding of the plurality of chunk embeddings, wherein each respective weight is used for the calculating of each corresponding respective embedding similarity score, and wherein each respective weight falls within a range from 0.0 to 1.0.

5. The method of claim 4, wherein each respective chunk embedding corresponding to a respective XAI asset chunk is assigned a corresponding respective weight that is greater than a corresponding respective weight assigned to each respective chunk embedding corresponding to a respective document chunk.

6. The method of claim 1, wherein the separating of the at least one XAI asset is based on spatial orientation of information contained within the at least one XAI asset.

7. The method of claim 1, wherein each respective embedding similarity score represents a degree to which a context of the corresponding respective chunk embedding matches a context of the query embedding.

8. The method of claim 1, wherein the accessing of the query comprises generating, by the at least one processor, the query, wherein the query relates to an explainability of the AI model.

9. The method of claim 8, wherein the generated query relates to a regulatory requirement associated with the AI model.

10. A computing device configured for assessing trustworthiness of an artificial intelligence (AI) model, the computing device comprising:

a processor;

a memory; and a communication interface coupled to each of the processor and the memory, wherein the processor is configured to:

access at least one explainable artificial intelligence (XAI) asset that relates to the AI model;

access a document that relates to the AI model;

separate the at least one XAI asset into at least one XAI asset chunk;

separate the document into at least one document chunk, wherein the separating of the document is based on a predetermined word count;

generate, via a pre-trained model, a plurality of chunk embeddings that includes a respective embedding for each respective XAI asset chunk of the at least one XAI asset chunk and each respective document chunk of the at least one document chunk;

access a query that relates to the trustworthiness of the AI model;

generate, via the pre-trained model, a query embedding for the query;

calculate a respective embedding similarity score for each respective chunk embedding of the plurality of chunk embeddings, wherein each respective similarity score is computed by applying a predetermined algorithm to each of the corresponding respective chunk embedding and the query embedding;

select a respective chunk embedding from the plurality of chunk embeddings having a highest corresponding embedding similarity score;

generate a context embedding by aggregating the query embedding with the selected chunk embedding; and generate, via a large language model (LLM), a response to the query based on the context embedding.

11. The computing device of claim 10, wherein the response includes an answer to the query and a rationale relating to how the answer was generated.

12. The computing device of claim 10, wherein the trustworthiness relates to at least one from among an explainability of the model and a potential risk associated with the model.

13. The computing device of claim 10, wherein the processor is further configured to assign a respective weight to each respective chunk embedding of the plurality of chunk embeddings, wherein each respective weight is used for the calculating of each corresponding respective embedding similarity score, and wherein each respective weight falls within a range from 0.0 to 1.0.

14. The computing device of claim 13, wherein each respective chunk embedding corresponding to a respective XAI asset chunk is assigned a corresponding respective weight that is greater than a corresponding respective weight assigned to each respective chunk embedding corresponding to a respective document chunk.

15. The computing device of claim 10, wherein the separating of the at least one XAI asset is based on spatial orientation of information contained within the at least one XAI asset.

16. The computing device of claim 10, wherein each respective embedding similarity score represents a degree to which a context of the corresponding respective chunk embedding matches a context of the query embedding.

17. The computing device of claim 10, wherein the accessing of the query comprises generating the query, wherein the query relates to an explainability of the AI model.

18. The computing device of claim 17, wherein the generated query relates to a regulatory requirement associated with the AI model.

19. A non-transitory computer readable storage medium storing instructions for assessing trustworthiness of an artificial intelligence (AI) model, the storage medium comprising executable code which, when executed by a processor, causes the processor to:

access at least one explainable artificial intelligence (XAI) asset that relates to the AI model;

access a document that relates to the AI model;

separate the at least one XAI asset into at least one XAI asset chunk;

separate the document into at least one document chunk, wherein the separating of the document is based on a predetermined word count;

generate, via a pre-trained model, a plurality of chunk embeddings that includes a respective embedding for each respective XAI asset chunk of the at least one XAI asset chunk and each respective document chunk of the at least one document chunk;

access a query that relates to the trustworthiness of the AI model;

generate, via the pre-trained model, a query embedding for the query;

calculate a respective embedding similarity score for each respective chunk embedding of the plurality of chunk embeddings, wherein each respective similarity score is computed by applying a predetermined algorithm to each of the corresponding respective chunk embedding and the query embedding;

select a respective chunk embedding from the plurality of chunk embeddings having a highest corresponding embedding similarity score;

generate a context embedding by aggregating the query embedding with the selected chunk embedding; and generate, via a large language model (LLM), a response to the query based on the context embedding.

20. The storage medium of claim 19, wherein the response includes an answer to the query and a rationale relating to how the answer was generated.

* * * * *